United States Patent [19]

Coughlin et al.

[11] Patent Number: 4,480,061

[45] Date of Patent: Oct. 30, 1984

[54] WOOD-LIKE ARTICLES MADE FROM CELLULOSIC FILLER LOADED ETHYLENE INTERPOLYMERS

[75] Inventors: Michael C. Coughlin; Timothy T. Schenck, both of Wilmington, Del.

[73] Assignee: E. I. Du Pont de Nemours and Company, Wilmington, Del.

[21] Appl. No.: 453,952

[22] Filed: Dec. 28, 1982

[51] Int. Cl.$^3$ .......................... C08K 5/01; B32B 27/30; B32B 27/32
[52] U.S. Cl. .......................................... 524/13; 524/14; 524/15; 524/35; 524/522; 524/523; 524/524; 524/733; 428/95; 428/96; 428/146; 525/222; 525/228
[58] Field of Search ...................... 524/13, 14, 15, 35, 524/109, 322, 425, 427, 433, 436, 444, 445, 493, 522, 523, 524, 733, 915; 428/95, 96, 146; 528/904, 222, 228

[56] References Cited

U.S. PATENT DOCUMENTS

| | | | |
|---|---|---|---|
| 3,888,810 | 6/1975 | Shinomura | 524/13 |
| 4,191,798 | 3/1980 | Schumacher et al. | 428/95 |
| 4,263,196 | 4/1981 | Schumacher et al. | 524/423 |
| 4,379,190 | 4/1983 | Schenck | 428/95 |
| 4,403,007 | 9/1983 | Coughlin | 524/14 |

*Primary Examiner*—John Kight
*Assistant Examiner*—Nathan M. Nutter

[57] ABSTRACT

Articles having wood-like properties and appearance are obtained from compositions comprising 5–55% by weight of an ethylene interpolymer, such as ethylene/vinyl ester, ethylene/unsaturated mono- or dicarboxylic acids or esters or salts of said unsaturated acids, etc.; 1–15% by weight of at least one plasticizer selected from the group consisting of processing oils, epoxidized oils, polyesters, polyethers and polyetheresters; 20–90% by weight of cellulosic filler or mixture of cellulosic filler and mineral filler; 0–10% by weight of at least one additive, such as organic acid, organic acid derivative and surface active agent; and 0–44% by weight of certain ethylene and propylene homo- and copolymers.

17 Claims, No Drawings

WOOD-LIKE ARTICLES MADE FROM CELLULOSIC FILLER LOADED ETHYLENE INTERPOLYMERS

BACKGROUND OF THE INVENTION

1. Field of the Invention

This invention relates to wood-like articles and more specifically it relates to wood-like articles obtained from wood-filled ethylene interpolymers.

2. Description of the Prior Art

U.S. Pat. No. 4,191,798 discloses highly filled thermoplastic compositions useful as sound-deadening sheeting for automotive carpets consisting essentially of (a) from about 5-50% by weight of at least one copolymer of ethylene with at least one comonomer such as vinyl esters of saturated carboxylic acid, unsaturated mono- or dicarboxylic acids, and esters of the unsaturated mono- or dicarboxylic acids; (b) from about 2-15% by weight of processing oil; and (c) from about 50-90% by weight of filler, such as calcium carbonate and barium sulfate.

Stead et al., European patent application No. 13,089, discloses the use of blends of ethylene/propylene copolymers with 40% wood flour in laminates with cloth.

Yagi, Japanese Pat. No. 79 92,613, discloses blends of atactic polypropylene with mixtures of calcium carbonate, ammonium phosphate and wood flour.

Nahano, et al., Japan Kokai No. 76 69,552, discloses blends containing 20-45% polyolefins, less than 50% powdered wood and less than 50% calcium carbonate.

Copending patent application Ser. No. 273,418, filed June 15, 1981, now U.S. Pat. No. 4,438,228, discloses filled thermoplastic compositions useful, for example, as sound-deadening sheeting for automotive carpet that are obtained by blending about 5-55% by weight of ethylene/α-olefin copolymer, the α-olefin containing from 4-10 carbon atoms; about 2-12% by weight of plasticizers selected from the group consisting of processing oils, epoxidized oils, polyesters, polyethers and polyetheresters; about 40-90% by weight of filler such as calcium carbonate, barium sulfate, hydrated alumina, clay, magnesium carbonate, calcium sulfate, silica, flyash, cement dust, wood flour, ground rice hulls and mixtures thereof; and optionally elastomeric polymers Copending patent application Ser. No. 273,419, filed June 15, 1981, now U.S. Pat. No. 4,403,007, discloses filled thermoplastic compositions useful, for example, as sound-deadening sheeting for automotive carpet that are obtained by blending about 5-55% by weight of an ethylene interpolymer, such as ethylene/vinyl acetate, ethylene/unsaturated mono- or dicarboxylic acid or esters of said unsaturated acids, etc.; about 1-15% by weight of a plasticizer selected from the group consisting of polyesters, polyethers, polyetheresters and combinations thereof with processing oil; about 40-90% by weight of filler, such as calcium carbonate, barium sulfate, hydrated alumina, clay, magnesium carbonate, calcium sulfate, silica, flyash, cement dust, wood flour, ground rice hulls and mixtures thereof; and optionally modifying resins, such as unvulcanized elastomeric polymers and certain other ethylene and propylene homo- and copolymers.

Copending patent application Ser. No. 273,420, filed June 15, 1981, now U.S. Pat. No. 4,379,190 thermoplastic compositions useful as sound-deadening sheeting having improved tensile elongation obtained by blending about 5-60% by weight of a mixture of at least two copolymers of ethylene, having specified molar comonomer contents, about 40-90% by weight of filler, such as calcium carbonate, barium sulfate, hydrated alumina, clay, magnesium carbonate, calcium sulfate, silica, flyash, cement dust, wood flour, ground rice hulls and mixtures thereof; and 0-15% by weight of plasticizer selected from the group consisting of processing oils, polyesters, polyethers, and polyetheresters; and optionally modifying resins such as elastomeric polymers and certain other ethylene and propylene homo- and copolymers.

SUMMARY OF THE INVENTION

According to the present invention there is provided an article having wood-like appearance and sufficiently high stiffness for a wood substitute made of a composition comprising (a) from about 5 to about 55% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40 to about 95% by weight, the comonomer content of said copolymer being from about 5 to about 60% by weight, and the melt index of said copolymer being from about 0.1 to about 150 g/10 min, provided that when said copolymer of ethylene is an ethylene/vinyl ester or ethylene/unsaturated mono- or dicarboxylic acid ester copolymer said copolymer can contain up to about 15% by weight of carbon monoxide, and further provided that when said comonomer(s) in said copolymer of ethylene is selected from the group consisting of vinyl esters of saturated carboxylic acids wherein the acid moiety has up to 4 carbon atoms, esters of unsaturated mono- and dicarboxylic acids of 3 to 5 carbon atoms wherein the alcohol moiety has 1 to 8 carbon atoms, vinyl ester and carbon monoxide, and unsaturated mono- or dicarboxylic acid ester and carbon monoxide then from about 2.5% to about 27.5% by weight of olefin polymer of ingredient (e) is present in combination with from about 2.5 to about 44% by weight of the ethylene copolymer; (b) from 1 to about 15% by weight of at least one plasticizer selected from the group consisting of processing oils, epoxidized oils, polyesters, polyethers, and polyether esters; (c) from about 20 to about 90% by weight of cellulosic filler or mixture of cellulosic filler with mineral filler; (d) from 0 to about 10% by weight of at least one additive selected from the group consisting of organic acids, organic acid derivatives and surface active agents; and (e) from 0 to about 44% by weight of olefin polymer selected from the group consisting of low density branched polyethylene, high density linear polyethylene, linear copolymers of ethylene and another olefin comonomer, polypropylene and copolymers of propylene and ethylene where the ethylene content is up to 20% by weight.

Further, according to the present invention there are provided extruded sheets or films, extruded profiles and injection molded articles having wood-like appearance and sufficiently high stiffness for a wood substitute comprising the compositions of the present invention.

Still further provided according to the present invention there are laminated structures having wood-like appearance and sufficiently high stiffness for a wood substitute comprising at least one layer of the composition of the present invention bonded to rigid substrates.

DETAILED DESCRIPTION OF THE INVENTION

It was discovered that the use of cellulosic fillers, such as wood flour, in combination with certain plasticized ethylene interpolymers would result in compositions that can be fabricated into articles that are remarkably wood-like with respect to appearance and rigidity. In addition the compositions are readily fabricable using thermoplastic processing methods.

The ethylene copolymers suitable for the wood-like article of the present invention are copolymers with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40 to about 95% by weight, the comonomer content of said copolymer being from about 5 to about 60% by weight, and the melt index of said copolymer being from about 0.1 to about 150 g/10 min, provided that when said copolymer of ethylene is an ethylene/vinyl ester or ethylene/unsaturated mono- or dicarboxylic acid ester copolymer said copolymer can contain up to about 15% by weight of carbon monoxide. Terpolymers of ethylene and the above comonomers are also suitable. Ionomers, which are the completely or partially neutralized copolymers of ethylene and the acids described above, are discussed in more detail in U.S. Pat. No. 3,264,272. In addition, terpolymers of ethylene/vinyl acetate/carbon monoxide ethylene/methyl acrylate/carbon monoxide, or ethylene/normal butyl acrylate/carbon monoxide containing up to about 15% by weight of carbon monoxide can also be employed. Provided that when said comonomer(s) in said copolymer of ethylene is selected from the group consisting of vinyl esters of saturated carboxylic acids wherein the acid moiety has up to 4 carbon atoms, esters of unsaturated mono- and dicarboxylic acids of 3 to 5 carbon atoms wherein the alcohol moiety has 1 to 8 carbon atoms, vinyl ester and carbon monoxide, and unsaturated mono- or dicarboxylic acid ester and carbon monoxide then from about 2.5% to about 27.5% by weight of olefin polymer of ingredient (e) is present in combination with from about 2.5 to about 44% by weight of the ethylene copolymer. In such ethylene copolymer and olefin polymer combinations the preferred amounts are from about 5 to about 25% by weight of ethylene copolymer and from about 5 to about 40% by weight of olefin polymer. The most preferred amounts are from about 7.5 to about 15% by weight of ethylene copolymer and from about 7.5 to about 24% by weight of olefin polymer.

The ethylene content of the copolymers described above is from about 40 to about 95% by weight and the total comonomer content is from about 5 to about 60% by weight. The preferred ethylene and comonomer level is from about 45 to about 95% and from about 5 to about 55% by weight, respectively. Most preferably, the ethylene and comonomer level is from about 60% to about 95% and from about 5 to about 40% by weight, respectively. Mixtures of two or more ethylene copolymers can be used in these blends in place of a single copolymer as long as the average values for the comonomer content will be within the above indicated range. In particular, mixtures as described and claimed in pending U.S. application Ser. No. 273,420, filed June 15, 1981 now U.S. Pat. No. 4,379,190, the disclosure of which is hereby incorporated by reference, can be used in the practice of this invention.

Melt index of the copolymers is from about 0.1 to about 150 g/10 min, preferably from about 0.3 to about 50 g/10 min, and most preferably from about 0.7 to about 10 g/10 min.

In accordance with the above, suitable ethylene copolymers include ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate Preferred polymers are: (a) ethylene copolymers with at least one comonomer selected from the group consisting of unsaturated mono- and dicarboxylic acids of 3 to 5 carbon atoms, and salts of said unsaturated acids, and (b) terpolymers of ethylene with these comonomers and with comonomer selected from the group consisting of esters of said unsaturated acids wherein the alcohol moiety has 1 to 8 carbon atoms and vinyl esters of saturated carboxylic acids wherein the acid moiety has up to 4 carbon atoms. Ionomers, which are described in more detail in U.S. Pat. No. 3,264,272 apparently interact strongly with the fillers described below, resulting in higher modulus and tensile strength than similarly filled compounds based on acid copolymers.

Preferred ethylene copolymers include ethylene/acrylic acid and its ionomers, ethylene/methacrylic acid and its ionomers, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/vinyl acetate/methacrylic acid and its ionomers, ethylene/vinyl acetate/acrylic acid and its ionomers, ethylene/vinyl acetate/monoethyl maleate and ethylene/methyl acrylate/monoethyl maleate.

Useful modifying resins in the practice of this invention are the low density branched homopolymers of ethylene, the high density linear homopolymers of ethylene the linear copolymers of ethylene and another olefin monomer, homopolymers of propylene, and copolymers of propylene and ethylene where the ethylene content is up to 20% by weight. For reasons of compatibility and the balance of properties obtained, the preferred materials are the high density ethylene homopolymers, the linear copolymers of ethylene and another olefin, and the copolymers of propylene and ethylene. The olefin content and the olefins used in the linear copolymers are described in U.S. Pat. No. 4,076,698.

The propylene/ethylene copolymers may contain up to 20% by weight of ethylene. The members of this class of modifying resins can be present in an amount of from 0 to about 44% by weight, preferably up to about 37.5% by weight, and most preferably up to about 18% by weight of the wood-like article of the present invention.

Generally from about 5 to about 55% by weight of ethylene copolymer is employed in the wood-like article of the present invention. Preferably from about 10 to 50% by weight, and most preferably from about 15 to about 30% by weight of ethylene copolymer is employed.

The first group of plasticizer ingredient of the wood-like article of the present invention is known as process or processing oil. Three types of processing oils are known—paraffinic, aromatic and naphthenic. None of these is pure; the grades identify the major oil type present.

Processing oils are also subdivided by viscosity range. "Thin" oils can be as low as 100–500 SUS (Saybolt Universal Seconds) at 100° F. (38° C.). "Heavy" oils can be as high as 6000 SUS at 100° F. (38° C.). Processing oils, especially naphthenic and aromatic oils with viscosity of from about 100 to 6000 SUS at 100° F. (38° C.) are preferred.

In the selection of a process oil, other factors such as the type of oil selected and its viscosity must be considered. These are discussed in detail in U.S. Pat. No. 4,191,798, the disclosure of which is hereby incorporated by reference.

The second group of plasticizers that are effective in the practice of the present invention is the group comprising epoxidized oils such as epoxidized soybean oil and epoxidized linseed oil.

The third group of plasticizers that are effective are the polyesters, which, in general, are liquid condensation products of a polybasic acid and a polyol. The term "liquid" in the context of the present invention is used to mean pourable at room temperature. The acid component is most often a saturated aliphatic dibasic acid or an aromatic dibasic acid; adipic acid, azelaic acid, phthalic acid, sebacic acid, and glutaric acid, or mixtures thereof are commonly used. The polyol can be an aliphatic polyol or a polyoxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic dibasic acids, and a polyol component of aliphatic polyol or even more preferably aliphatic glycol. Most preferred compositions are based on adipic or azelaic acid, and propylene glycol or 1,3- or 1,4-butane glycol. The molecular weight of these plasticizers can vary from a low of a few hundred up to a high of about 10,000. The molecular weight of commercial products is seldom specified. Typically in the trade, the molecular weight range of the product is classified as low, medium, or high. The preferred range for purposes of this invention is that classified as medium.

Mixtures of polyesters with hydrocarbon oils are also effective plasticizers in the present invention. One objective of using such a mixture is to couple the high efficiency of the relatively high cost polyester with the low cost of the hydrocarbon oil. The cost/performance of a compound plasticized with such a mixture can be improved significantly for a given application because properties can be tailored more precisely, or filler levels can be increased.

A separate class of plasticizers, polyethers and polyether esters, are also effective plasticizers in the wood-like articles of the present invention. In general, polyethers are oligomers or polymers of alkylene oxides; polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid to form the ester. Fatty acids such as lauric and stearic acids are commonly used; the most common examples of these compounds are the mono- and diesters of polyethylene or polypropylene glycol. The molecular weight of polyethers may range up to those typical of high polymers.

Preferred polyether compositions in the practice of this invention are those consisting of the polyols based on random and/or block copolymers of ethylene oxides and propylene oxides. The copolymer polyols provide better performance in terms of efficiency in compounds of the present invention containing very high levels of filler.

Mixtures of the polyether or the polyether ester plasticizers with either a polyester plasticizer or a hydrocarbon processing oil can also be used in the practice of this invention. The advantage of polyether/polyester combination is the lower cost since the polyethers are cheaper than the polyesters. Combinations of polyether and processing oil are also cheaper because of the lower cost of the oil.

The amount of plasticizer, such as the process oil, present in the wood-like article of the present invention is from about 1 to about 15% by weight, preferably from about 2 to about 12% by weight. Most preferably the amount of plasticizer is from about 3 to about 8% by weight.

The third essential ingredient of the wood-like article of the present invention is the filler. Suitable fillers are cellulosic fillers, such as soft and hard wood flours, wood fiber, sawdust, corn cob flour, ground rice hulls, and shell flours, such as peanut shell flour and walnut shell flour, and, optionally mixtures of these fillers with mineral fillers such as calcium carbonate, barium sulfate, hydrated alumina, clay, magnesium carbonate, calcium sulfate, silica, fly ash, and cement dust. Preferred fillers are the soft and hard wood flours, and their mixtures with the mineral fillers specified above.

The amount of filler present in the wood-like article of the present invention is from about 20 to about 90% by weight, preferably from about 45 to about 85% by weight and most preferably from about 45 to about 80% by weight.

In addition to the above ingredients the wood-like article of the present invention may also contain additional additives to obtain certain characteristics. Among such additives one can list organic acids of the proper type. Organic acids cover a wide range of saturated acid types, from $C_6$ monobasic saturated carboxylic acids such as caproic to long-chain types such as $C_{22}$ (behenic). Fatty acids are highly effective in enhancing elongation and in increasing melt index at very low concentrations. A concomitant decrease in blend stiffness is generally also attained. In addition to monomeric organic acids, the so-called "dimer" and "trimer" acids (dimers and trimers of the simpler straight-chain forms) having up to 54 carbon atoms are also highly effective. Mixtures of the above-mentioned acids may be employed, as may mixtures of any of the acid types disclosed herein.

In addition to the acids listed above, saturated polybasic acids are also effective. In this instance, when an acid such as azelaic acid ($C_9$, saturated, dibasic; $HOOC.(CH_2)_7.COOH$) is employed, the elongation values for blends will be markedly improved, the stiffness will be reduced, but the melt index will be virtually unchanged. Thus, the compounder is afforded an added tool for securing a desired balance of properties.

Further, mono- or polyunsaturated organic acids, including the $C_{12}$-$C_{20}$ mono- and dicarboxylic acids, and, in particular, oleic acid (monounsaturated $C_{18}$-type fatty acid) are also highly effective.

Cycloalkyl and aromatic carboxylic acids are also effective in the practice of this invention.

Mono-, di- and trivalent metal salts of organic acids, in particular the calcium and zinc salts of fatty acids, are very effective. Esters and amides of the organic acids are also effective.

The number of organic acids in existence is enormous; the examples named above can be replaced by other close analogs with good results and without departing from the spirit of this invention.

A more detailed description of the organic acids that are suitable for use in the present invention can be found in copending patent application Ser. No. 339,468 filed on Jan. 15, 1982, now U.S. Pat. No. 4,434,258, the disclosure of which is hereby incorporated by reference.

Another group of additives that can be employed in the wood-like article of the present invention are surface active agents of the proper type. These will produce a large increase in the tensile elongation value of the wood-like article.

Surfactants which are effective are those which are selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethoxylated alkyl phenols and of oils and of fatty acids, naphthalene and alkyl naphthalene sulfonates, condensed naphthalene sulfonates, petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts thereof; phosphate derivatives comprising phosphate esters, phosphate alcohol ethoxylates, phosphate ether ethoxylates, phosphate alkyl acids and phosphate alkyl quaternaries; and quaternary surfactants.

The number of surfactants in existence is enormous; the examples named above can be replaced by other close analogs with good results and without departing from the spirit of this invention.

A more detailed description of the surface active agents suitable for use can be found in copending patent application Ser. No. 400,243 filed July 19, 1982, now U.S. Pat. No. 4,430,468, disclosure of which is hereby incorporated by reference.

The amount of the additive, such as the organic acid or surfactant will generally range from 0 to about 10% by weight.

Polymers, both homo- and copolymers, other than the ones referred to above, can also be used to some extent in combination with the above specified polymers without significantly interfering with the advantages obtained by the present invention. These include, but without limitation, polymers such as ethylene/carbon monoxide and ethylene/sulfur dioxide. Similarly other ingredients can also be added to the wood-like article of the present invention by a compounder in order to obtain some desired effect, such as reduction of cost, or enhancement of a physical property. Accordingly, extender resins, waxes, foaming agents, crosslinking agents, antioxidants, etc. that are widely used, can be included in the wood-like articles of the present invention.

Commercially sized batch-type blenders such as a Banbury or equivalent intensive mixer are entirely suitable for blending the ingredients of the present invention. Continuous mixing devices such as a Farrel Continuous Mixer ("FCM") or a twin screw extruder are also excellent. With either type of unit, dry ingredients are charged in routine fashion. It is convenient in most cases to inject the plasticizer component directly into the mixing chamber of either unit as per widely used practice with these types of equipment. When more than one plasticizer is used, and where any one of the plasticizers is present in a small amount (less than about 10 weight percent of the total plasticizer mixture), the plasticizers should be preblended before addition to the other ingredients of the present invention. This will facilitate uniform distribution of each plasticizer component in the final composition and thus ensure that optimum properties are obtained. Similarly, since the amount of organic acid employed generally is so small, less than 1% for many cases, it is important to be certain that the organic acid is thoroughly mixed into the final blend. If this is not done, highly erratic values for physical properties may result. Thus, it may often prove helpful to premix the organic acid into a portion of one of the other ingredients, e.g., a liquid organic acid may be premixed with the process oil or a solid organic acid may be premixed with an aliquot of the filler. If desired, the copolymer and the plasticizer(s) can be precompounded as a "Masterbactch" in a suitable intensive mixing device (e.g., Banbury mixer or screw extruder). This "Masterbatch" can then be compounded with the filler and the other remaining ingredients to produce the final composition. A mix cycle of about 3 minutes is generally adequate for a Banbury mixer at an operating temperature usually between 325° and 375° F. The operating rate for an FCM unit generally will fall within ranges predicted by literature prepared by the Farrel Company, Ansonia, Conn. Here, temperatures between 325° and 425° F. are effective. In both cases, a very low plasticizer level, say about 2–3%, may require higher temperatures, while plasticizer levels above about 7% may mix well at lower mixer temperatures.

Generally, changes in the sequence of addition of ingredients has not been found to be significant, provided that the final mixture is thoroughly fluxed to attain homogeneity.

Once the ingredients are mixed, routine commercial practices may be used, such as underwater melt cutting plus drying or use of sheeting plus chopping methods, to obtain a pelletized product. The mixture, either as a pellet or as the hot mixture direct from the compounding device, can be formed into useful articles by a variety of methods. For example, profiles can be extruded for use as decorative molding and trim stock. These objects can be readily sawed and nailed, or otherwise joined, by methods typically used with natural wood. The present compositions can also be injection molded into articles such as window and picture frames, or intricately shaped trim and structural components for furniture. Sheet and film can be extruded or calendered for use as paneling or veneer in laminated structures. Laminated structures, wherein at least one layer of the wood-like composition of the present invention is bonded to rigid substrates can also be obtained. Such substrates can, for example, be selected from the group consisting of thermoplastic and thermosetting resins and composite board. For example, laminated structures can be prepared by extrusion coating of appropriate substrates. An important advantage of the ability to produce wood-like articles by these processes is that the expensive, secondary forming steps necessary to produce similar objects from raw lumber stock are eliminated; in other words, an article with the appearance of wood is produced directly. The wood-like articles of the present invention will also readily accept paints, varnishes, and other coatings typically used to finish natural wood.

The Examples which follow are given for the purpose of illustrating the present invention. All parts and percentages are by weight unless otherwise specified.

EXAMPLES 1-3

All compounds were prepared in a Banbury mixer. The ingredients were first charged in the chamber in an amount adequate to fill the entire chamber. The chamber was then closed using a ram pressure of 25 psi. The ingredients were mixed for about 7 min. at a rotor speed which was continuously adjusted to maintain a temperature of 180°-185° C.

Compositions and physical properties are summarized in Table 1. These examples compare compounds based on an ethylene/methacrylic acid copolymer (Example No. 1), with those based on the sodium and zinc ionomers prepared from this copolymer. The data show that the ionomer based formulations have significantly higher modulus and tensile strength. Sheets prepared from these formulations by compression molding or passing through a two roll mill were wood-like in appearance.

TABLE I

|  | Ex. 1 | Ex. 2 | Ex. 3 |
|---|---|---|---|
| Ingredients |  |  |  |
| E/MAA[1], % | 30 | — | — |
| Ionomer No. 1[2], % | — | 30 | — |
| Ionomer No. 2[3], % | — | — | 30 |
| "Plastolein" 9776,[4] % | 10 | 10 | 10 |
| Wood Flour[5], % | 60 | 60 | 60 |
| Physical Properties |  |  |  |
| Density, g/cc | 1.14 | 1.17 | 1.15 |
| Tensile Strength[6], |  |  |  |
| MPa, | 2.8 | 9.9 | 8.9 |
| psi, | 404 | 1436 | 1293 |
| Tensile Elongation[6], % | 5 | 5 | 5 |
| Flexural Modulus[7] |  |  |  |
| GPa, | 0.31 | 1.05 | 1.52 |

TABLE I-continued

|  | Ex. 1 | Ex. 2 | Ex. 3 |
|---|---|---|---|
| Kpsi, | 44.8 | 151.8 | 220.8 |

Footnotes for Table I
[1]E/MAA copolymer: 90% ethylene/10% methacrylic acid; 35 MI.
[2]Ionomer No. 1: The zinc ionomer prepared from the E/MAA copolymer of footnote (1) by neutralizing 55% of the acid groups with $Zn^{++}$.
[3]Ionomer No. 2: The sodium ionomer prepared from the E/MAA copolymer of footnote (1) by neutralizing 55% of the acid groups with $Na^+$.
[4]"Plastolein" 9776: polyester oil plasticizer, Emery Industries, Inc.
[5]Wood flour: Wilner #179 wood flour; Wilner Wood Products Co.
[6]ASTM D1708, 2 inches/min; 0.050" (1.27 mm) nominal compression molded plaque.
[7]ASTM D790, 0.2 inches/min; 0.050" (1.27 mm) nominal compression molded plaque.

EXAMPLES 4-6

These compounds were prepared in the same manner as the compounds of Examples 1 to 3. Compositions and physical properties are summarized in Table II. These examples compare plasticizer/additive systems in similar ionomer based compounds. The data show that flexural modulus and tensile strength can be varied over a significant range using these systems. All three formulations could be used to produce plaques and sheet samples which were wood-like in appearance.

TABLE II

|  | Ex. 4 | Ex. 5 | Ex. 6 |
|---|---|---|---|
| Ingredients |  |  |  |
| Ionomer No. 3[1], % | 45 | 45 | 45 |
| "Circosol" 4240[2], % | 5 | — | 4.7 |
| "Plastolein" 9776, % | — | 5 | — |
| Stearic Acid, % | — | — | 0.3 |
| Wood Flour[3], % | 50 | 50 | 50 |
| Physical Properties |  |  |  |
| Density, g/cc | 1.11 | 1.12 | 1.13 |
| Tensile Strength |  |  |  |
| MPa, | 16.3 | 7.3 | 14. |
| psi, | 2362 | 1060 | 2050 |
| Tensile Elongation, % | 23 | 23 | 23 |
| Flexural Modulus |  |  |  |
| GPa, | 0.98 | 0.75 | 1.44 |
| Kpsi, | 141.5 | 108.5 | 208.6 |

Footnotes for Table II
[1]Ionomer No. 3: 91.3% ethylene/8.7% methacrylic acid, 10 MI copolymer neutralized 18% with $Zn^{++}$.
[2]"Circosol" 4240: Naphthenic processing oil; viscosity 2525 Saybolt Universal Seconds at 100° F.; Sun Oil Co.
[3]Wood flour: Wilner #179 wood flour; Wilner Wood Products Co.

COMPARATIVE EXAMPLE 1 AND EXAMPLE 7

These compounds were prepared in the same manner as the compounds of Examples 1 to 3. Compositions and physical properties are summarized in Table III. These examples compare the physical properties of a compound based on an ethylene/vinyl acetate copolymer only (Comparative Example 1) with one based on a mixture of the same copolymer and high density polyethylene (HDPE). The data show that both the flexural modulus and tensile strength are increased significantly by the inclusion of the HDPE, resulting in a product that is not only wood-like in appearance, but also in physical properties in terms of stiffness and strength.

TABLE III

|  | Ex. C1 | Ex. 7 |
|---|---|---|
| Ingredients |  |  |
| EVA[1], % | 35 | 7 |
| HDPE[2], % | — | 28 |
| "Plastolein" 9776, % | 5 | 5 |

TABLE III-continued

|  | Ex. C1 | Ex. 7 |
|---|---|---|
| Wood Flour[3], % | 60 | 60 |
| Physical Properties |  |  |
| Density, g/cc | 1.16 | 1.16 |
| Strength |  |  |
| MPa, | 1.89 | 6.96 |
| psi, | 275 | 1009 |
| Tensile Elongation, % | 251 | 11 |
| Flexural Modulus |  |  |
| MPa, | 114 | 907 |
| Kpsi, | 16.6 | 131.6 |

Footnotes for Table III
[1] EVA copolymer: 82% ethylene/18 vinyl acetate: 2.5 MI.
[2] HDPE: linear polyethylene, 0.95 g/cc density, 0.45 MI.
[3] Wood flour: Wilner #139 wood flour; Wilner Wood Products Co.

We claim:

1. An article having wood-like appearance and sufficiently high stiffness for a wood substitute made of a composition comprising
   (a) from about 15 to about 55% by weight of at least one copolymer of ethylene with at least one comonomer selected from the group consisting of salts of unsaturated mono- and dicarboxylic acids of 3 to 5 carbon atoms, optionally said copolymer of ethylene may contain additional comonomer selected from the group consisting of esters of said unsaturated acids wherein the alcohol moiety has 1 to 8 carbon atoms and vinyl esters of saturated carboxylic acids wherein the acid moiety has up to 4 carbon atoms, the ethylene content of said copolymer being from about 40 to about 95% by weight, the comonomer content of said copolymer being from about 5 to about 60% by weight, and the melt index of said copolymer being from about 0.1 to about 150 g/10 min;
   (b) from about 1 to about 15% by weight of at least one plasticizer selected from the group consisting of processing oils, epoxidized oils, polyesters, polyethers, and polyether esters;
   (c) from about 20 to about 70% by weight of cellulosic filler;
   (d) from 0 to about 10% by weight of at least one additive selected from the group consisting of organic acids, organic acid derivatives and surface active agents; and
   (e) from 0 to about 44% by weight of olefin polymer selected from the group consisting of low density branched polyethylene, high density linear polyethylene, linear copolymers of ethylene and another olefin comonomer, polypropylene and copolymers of propylene and ethylene where the ethylene content is up to 20% by weight.

2. The wood-like article of claim 1 wherein said cellulosic filler is selected from the group consisting of soft and hard wood flours, wood fiber, sawdust, corn cob flour, ground rice hulls, and shell flours.

3. The wood-like article of claim 2 wherein
   (a) said copolymer of ethylene is present in an amount of from about 15 to about 50% by weight, the ethylene content of said copolymer being from about 45 to about 90% by weight, the comonomer content of said copolymer being from about 10 to about 55% by weight and the melt index of said copolymer being from about 0.3 to about 50 g/10 min;
   (b) said plasticizer is present in an amount of from about 2 to about 12% by weight; and
   (c) said filler is present in an amount of from about 45 to about 70% by weight.

4. The wood-like article of claim 3 wherein said copolymer of ethylene is selected from the group consisting of, ionomers of ethylene/acrylic acid, ethylene/methacrylic acid, ethylene/isobutyl acrylate/methacrylic acid, ethylene/normal butyl acrylate/methacrylic acid, ethylene/isobutyl acrylate/acrylic acid, ethylene/normal butyl acrylate/acrylic acid, ethylen/vinyl acetate/methacrylic acid, ethylene/vinyl acetate/acrylic acid, ethylene/vinyl acetate/monoethyl maleate, and ethylene/methyl acrylate/monoethyl maleate.

5. The wood-like article of claim 4 wherein said filler is selected from the group consisting of soft and hard wood flours.

6. The wood-like article of claim 3 wherein said copolymer of ethylene contains at least one comonomer selected from the group consisting of the salts of unsaturated mono- and dicarboxylic acids of 3 to 5 carbon atoms, and, when present, additional comonomer(s) are selected from the group consisting of esters of said unsaturated acids wherein the alcohol moiety has 1 to 8 carbon atoms and vinyl esters of saturated carboxylic acids wherein the acid moiety has up to 4 carbon atoms.

7. The wood-like article of claim 5, wherein
   (a) said copolymer of ethylene is present in an amount of from about 15 to about 30% by weight; the ethylene content of said copolymer being from about 60 to about 85% by weight, the comonomer content of said copolymer being from about 15 to about 40% by weight, and the melt index of said copolymer being from about 0.7 to about 10 g/min.; and
   (b) said plasticizer is present in an amount of from about 3 to about 8% by weight.

8. The wood-like article of claim 7 wherein said copolymer of ethylene is selected from the group consisting of ionomers of ethylene/acrylic acid, ethylene/methacrylic acid, ethylene/isobutyl acrylate/methacrylic acid ethylene/normal butylacrylate/-methacrylic acid, ethylene/isobutyl acrylate/acrylic acid, ethylene/normal butyl acrylate/acrylic acid, ethylene/vinyl acetate/methacrylic acid, ethylene/vinyl acetate/acrylic acid, ethylene/vinyl acetate/monoethyl maleate and ethylene/methyl acrylate/monoethyl maleate.

9. The wood-like article of claim 1 in the form of sheet or film having sufficiently high stiffness for a wood substitute.

10. The wood-like article of claim 4 in the form of sheet or film having sufficiently high stiffness for a wood substitute.

11. The wood-like article of claim 8 in the form of sheet or film having sufficiently high stiffness for a wood substitute.

12. The wood-like article of claim 1 in the form of injection molded article having sufficiently high stiffness for a wood substitute.

13. The wood-like article of claim 4 in the form of injection molded article having sufficiently high stiffness for a wood substitute.

14. The wood-like article of claim 8 in the form of injection molded article having sufficiently high stiffness for a wood substitute.

15. The wood-like article of claim 1 in the form of extruded profile having sufficiently high stiffness for a wood substitute.

16. The wood-like article of claim 4 in the form of extruded profile having sufficiently high stiffness for a wood substitute.

17. The wood-like article of claim 8 in the form of extruded profile having sufficiently high stiffness for a wood substitute.

* * * * *